(12) United States Patent
Wei

(10) Patent No.: US 9,197,154 B2
(45) Date of Patent: Nov. 24, 2015

(54) DETACHABLE JUNCTION BOX BASE

(71) Applicant: Chang Wei, New Taipei (TW)

(72) Inventor: Chang Wei, New Taipei (TW)

(73) Assignee: T-Conn Precision Corporation, Taipei (TW)

( * ) Notice: Subject to any disclaimer, the term of this patent is extended or adjusted under 35 U.S.C. 154(b) by 10 days.

(21) Appl. No.: 13/655,456

(22) Filed: Oct. 19, 2012

(65) Prior Publication Data

US 2014/0048327 A1     Feb. 20, 2014

(30) Foreign Application Priority Data

Aug. 15, 2012   (TW) ............................. 101215668 U

(51) Int. Cl.
    *H05K 7/02*     (2006.01)
    *H05K 7/14*     (2006.01)
    *H02S 40/34*    (2014.01)

(52) U.S. Cl.
    CPC ..................................... *H02S 40/34* (2014.01)

(58) Field of Classification Search
    USPC ............. 174/541, 542; 361/679.4; 248/349.1, 248/346.03
    See application file for complete search history.

(56) References Cited

U.S. PATENT DOCUMENTS

2008/0024975 A1\*   1/2008  Huang et al. ................... 361/686
2012/0063079 A1\*   3/2012  Yeh ............................. 361/679.4

\* cited by examiner

*Primary Examiner* — Hung Ngo

(57) ABSTRACT

A detachable solar junction box base is disclosed, having a junction box, whose left and right sides being respectively installed with a pivotal connection button, and the bottom side thereof being installed with at least an elastic snap tab, two elastic clip tabs, a first connection port and a second connection port; and a base, the body thereof being an integral base formed by two arm parts and a traverse board part, in which the two arm parts are located at the left and right sides of the base and the traverse board part is disposed at the front end of the base, and in which each of the arm parts is respectively installed with an ear seat and a pivotal connection hole at the interior corner thereof, as well as a hollow accommodation part constituted by the arm parts and the traverse board part to receive the junction box.

10 Claims, 10 Drawing Sheets

DETACHABLE JUNCTION BOX BASE

BACKGROUND OF THE INVENTION

1. Field of the Invention

The present invention generally relates to a detachable junction box base; in particular, it relates to a junction box base characterized in a detachable structure for connections to a micro inverter.

2. Description of Related Art

It is known that the prior art solar junction box base can be a type of "fixed junction box base" manufactured by Amphenol Co. in United States. Refer to FIG. 7, wherein a junction box base 4 is configured with a junction box 41 and a plurality of elastic clip tabs 42, and the bottom side of the junction box is configured with a first connection port 411, a second connection port 412 and an elastic clip hook 413. Two connection ports 411, 412 and the elastic clip hook 413 are respectively and correspondingly clip connected to each of the connection ports and clip hole located on the upper side of a micro inverter 5, and the plurality of elastic clip tabs 42 symmetrically configured in two rows are correspondingly clip connected to two rows of guiding ribs on the micro inverter 5 (not shown). However, the prior art fixed junction box base and the junction box are integrally fabricated, indicating that the junction box and the base can not be detached or separated and the movable detachment feature is not provided. Moreover, its large size and substantial occupation of space may lead to difficulties in product assembly and accommodation operations.

Hence, according to aforementioned drawbacks found in prior art, the present invention is directed to improve the assembly and reception operations of the junction box base in order to embody the features regarding to smaller physical size, convenient install and un-install processes, increased stability in electric power transmissions as well as reduced production and assembly costs, thus further elevating the integral performance of the product.

With regards to such prior art problems, the motivation of the present invention essentially lies in expecting to provide a detachable junction box base which enables, through the design thereof, excellent applicability, detachable modularization design, connectivity to devices of various specifications, convenient assembly operations, simple package and increased junction box connection stability, based on numerous researches and efforts of the inventors in product design and fabrication aspects.

SUMMARY OF THE INVENTION

The present invention is directed to enhance the effects of applicability, increased junction box connection stability, convenient assembly operations and connectivity to devices of various specifications by applying the modularization design and movable reception structure of the detachable junction box base according to the present invention.

The present invention is also directed to enhance the electric power transmission stability in the junction box and to further reduce the manufacture costs by means of the firm connections between the junction box base and a micro inverter and the detachable design thereof in accordance with the present invention.

According to an embodiment of the present invention, a detachable junction box base comprises a junction box including left and right sides respectively installed with a pivotal connection button, and the bottom side thereof being installed with at least an elastic snap tab, two elastic clip tabs, a first connection port and a second connection port; and a base, the body thereof being an integral base formed by two arm parts and a traverse board part, in which the two arm parts are located at the left and right sides of the base and the traverse board part is disposed at the front end of the base, and in which each of the arm parts is respectively installed with an ear seat and a pivotal connection hole at the interior corner thereof, as well as a hollow accommodation part constituted by the arm parts and the traverse board part in order to receive the junction box.

In an embodiment of the present invention, the pivotal connection button of the junction box is pivotally and movably connected to the pivotal connection hole in the base.

In another embodiment of the present invention, the pivotal connection button can be a pivotal connection protrusive point configured in a hemispherical shape.

In another embodiment of the present invention, the pivotal connection hole can be configured in a hemispherical shaped recess allowing a movable sleeve joint with the pivotal connection protrusive point.

In an embodiment of the present invention, the two connection ports of the junction box can be respectively and mutually connected to a connection port installed on a DC/AC micro inverter, a DC/DC converter or a DC/DC optimizer.

In an embodiment of the present invention, an elastic snap tab and two elastic clip tabs of the junction box can be respectively and mutually clip jointed to a snap hole and two clip holes of a first positioning protrusive board installed on a DC/AC micro inverter, a DC/DC converter or a DC/DC optimizer.

In an embodiment of the present invention, the base is a detachable base allowing detachment of pivotal connection buttons through the pivotal connection holes.

In an embodiment of the present invention, the base comprises a movable base capable of 180° rotations using the pivotal connection button as the rotation axis configuring an open-flat or folded profile along with the junction box.

In an embodiment of the present invention, upon folding the base up with the junction box, the junction box is received inside the hollow accommodation part of the base.

In an embodiment of the present invention, the traverse board part of the base is installed with a trough, in which the trough is mutually clip jointed to a second positioning protrusive board of the micro inverter and allows the operation space for rotating the base.

DETAILED DESCRIPTION OF THE PREFERRED EMBODIMENTS

In order to fully understand the objectives, characteristics and effects of the present inventions, the present invention is now illustrated through the following embodiments in conjunction with appended drawings for detailed descriptions thereof, as set forth hereunder.

Figure 1A:
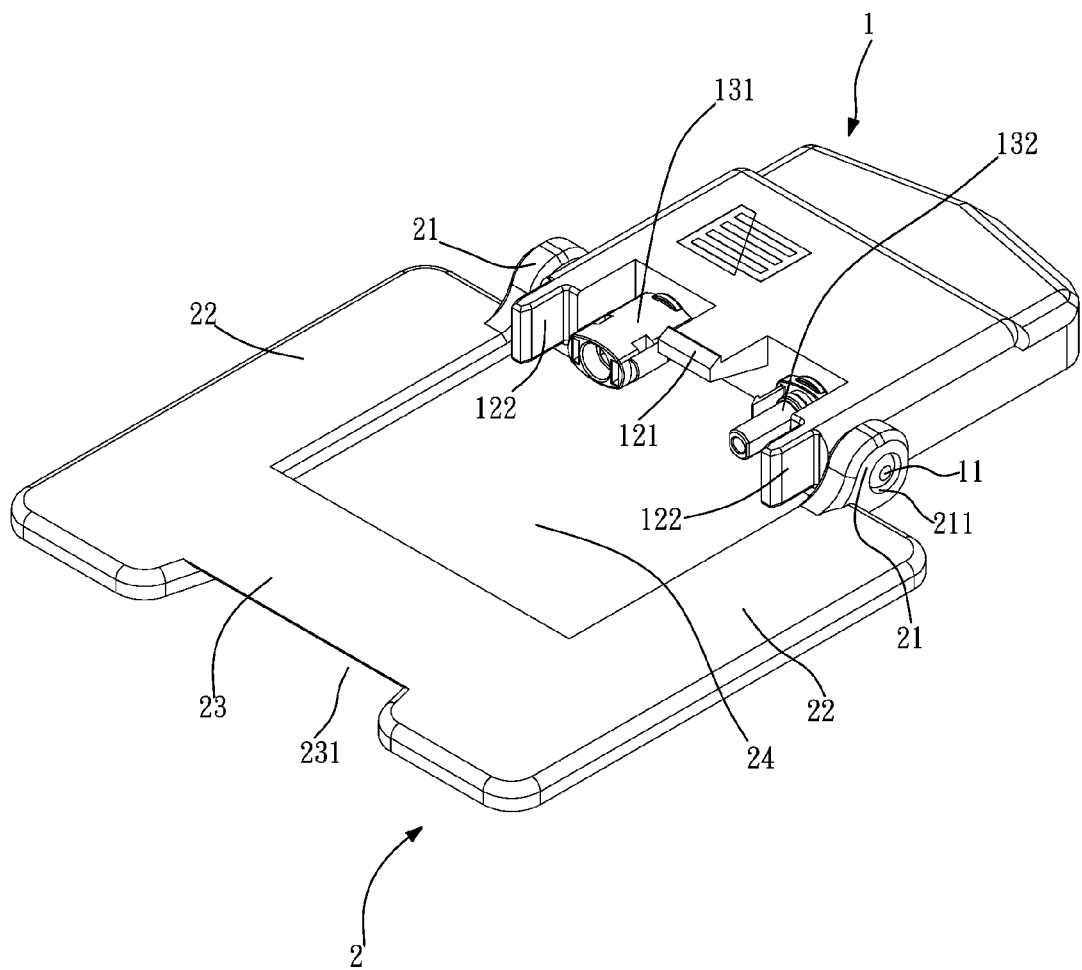
FIG. 1A illustrates a stereo perspective view of the detachable junction box base according to an embodiment of the present invention.
Figure 1B:
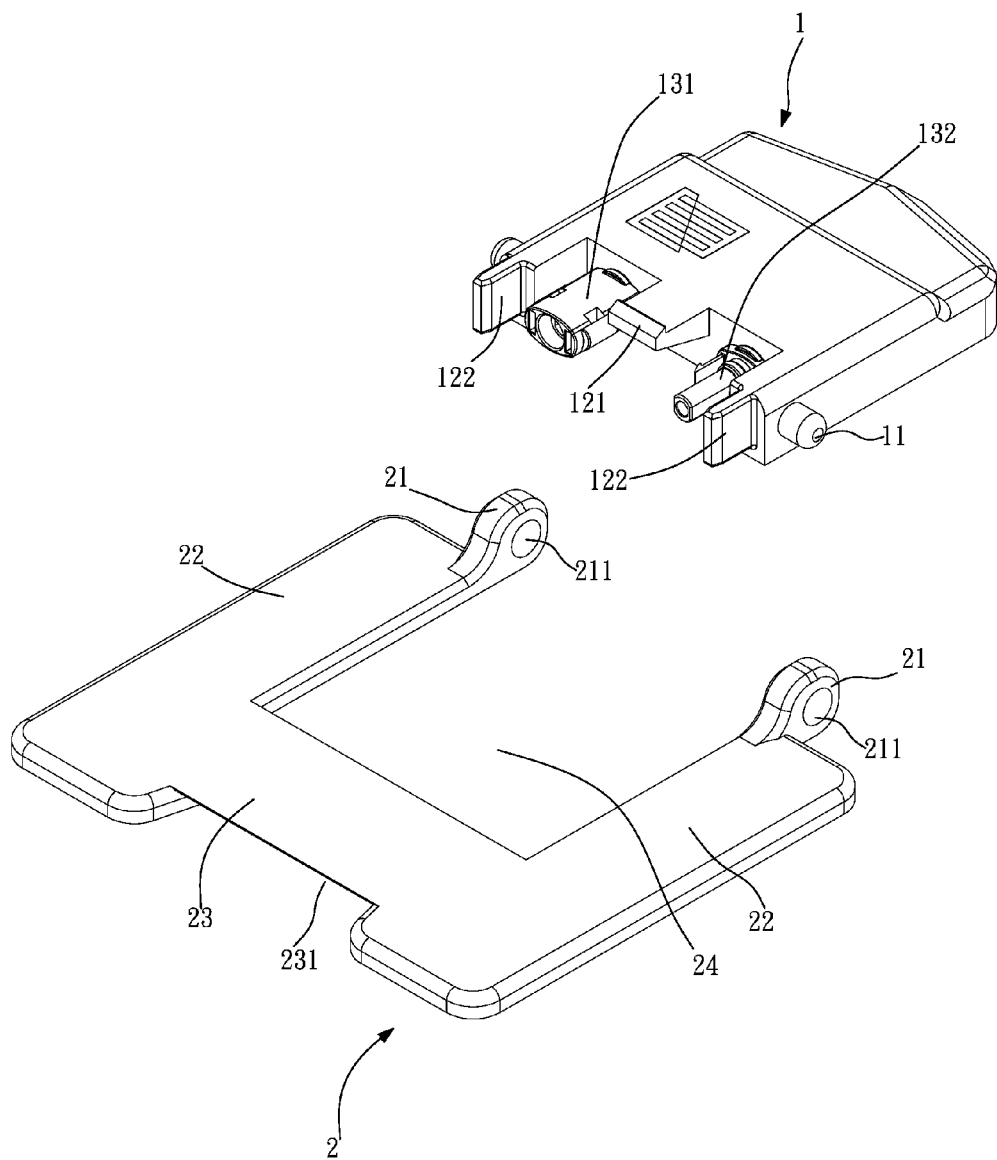
FIG. 1B illustrates a stereo perspective view of the detachable junction box base according to an embodiment of the present invention, with the junction box and the base being separated.
Figure 4A:
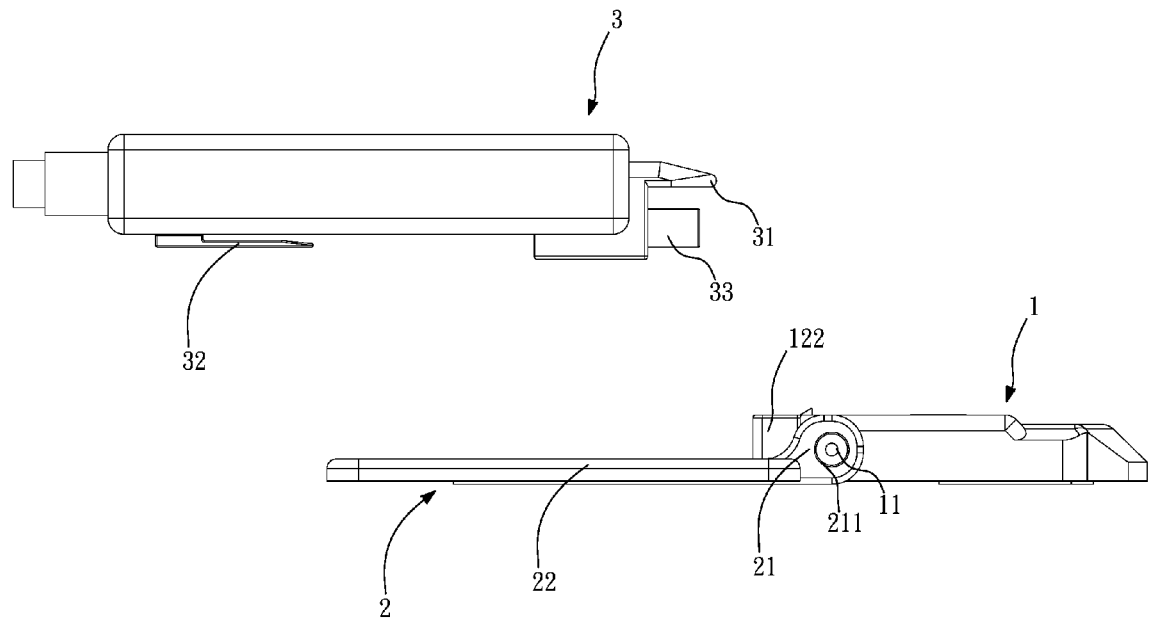
FIG. 4A illustrates a right side view of the detachable junction box base according to an embodiment of the present invention, before connected to a micro inverter.
Figure 4B:
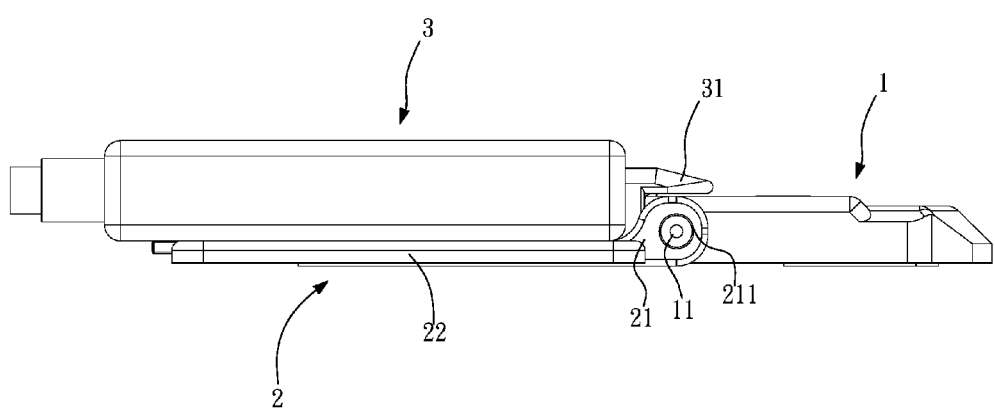
FIG. 4B illustrates a right side view of the detachable junction box base according to an embodiment of the present invention, after connected to a micro inverter.
Figure 5A:
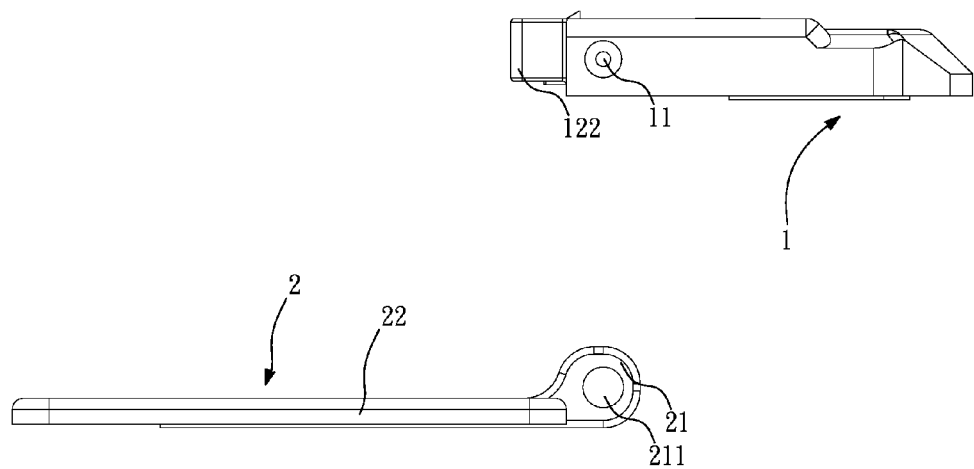
FIG. 5A illustrates a right side view of the detachable junction box base according to an embodiment of the present invention illustrating the junction box and the base being separated.
Figure 5B:
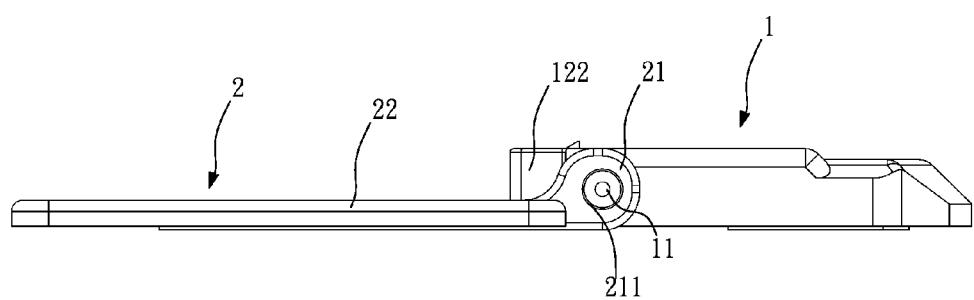
FIG. 5B illustrates a right side view of the detachable junction box base according to an embodiment of the present invention.
Figure 6A:
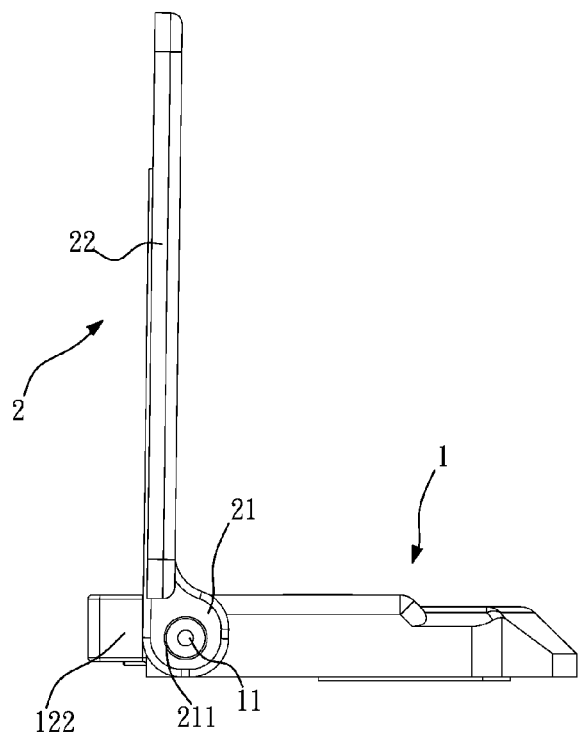
FIG. 6A illustrates a right side view of the detachable junction box base upon being rotated to a 90° rotation according to an embodiment of the present invention.
Figure 6B:
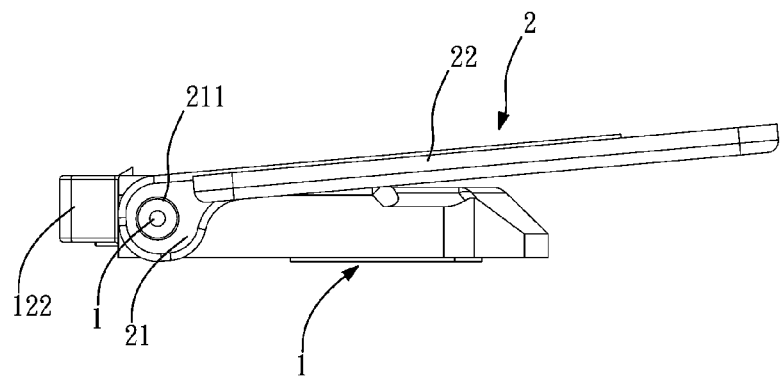
FIG. 6B illustrates a right side view of the detachable junction box base upon being rotated to a near 180° rotation according to an embodiment of the present invention.
Figure 7:
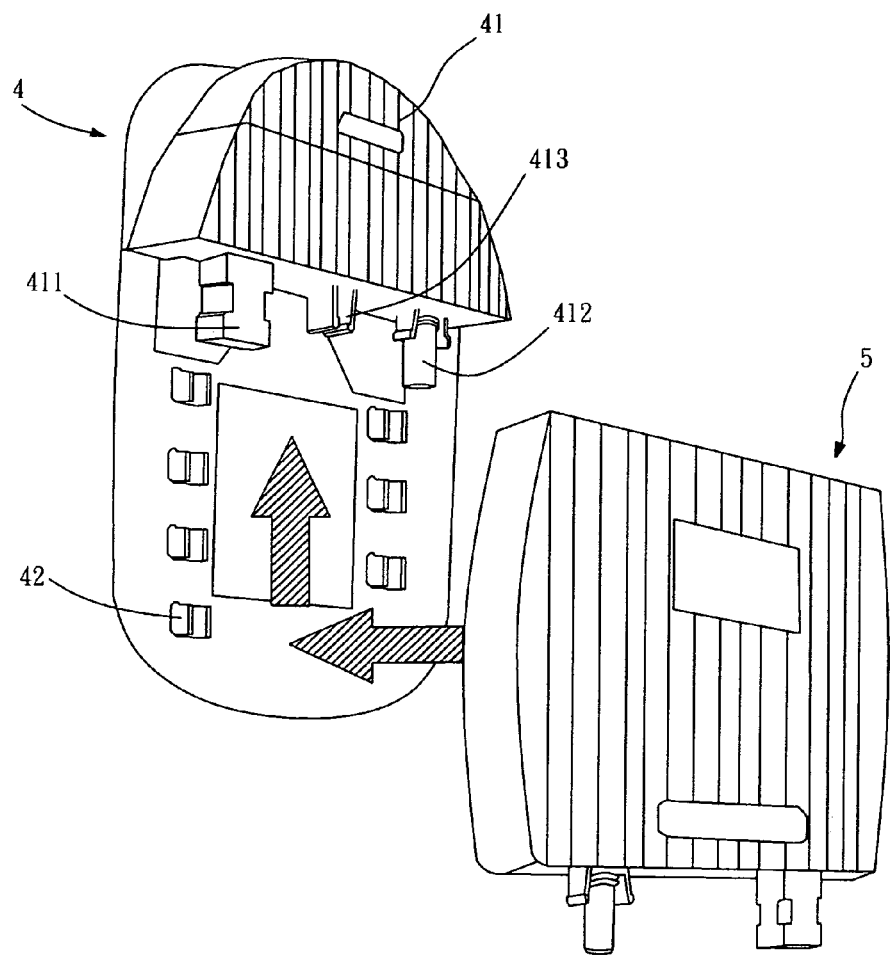
FIG. 7 illustrates the prior art fixed junction box base.

FIGS. 1A and 1B, a stereo perspective view of the detachable junction box base and a stereo perspective view thereof according an embodiment of the present invention, in which the junction box and the base are separated, are respectively illustrated. As shown in Figures, the detachable junction box base comprises a junction box 1, whose left and right sides being respectively installed with a pivotal connection button 11, and the bottom side thereof being installed with at least an elastic snap tab 121, two elastic clip tabs 122, a first connection port 131 and a second connection port 132; and a base 2, the body thereof being an integral base 2 formed by two arm parts 22 and a traverse board part 23, in which the two arm parts 22 are located at the left and right sides of the base 2 and the traverse board part 23 is disposed at the front end of the base 2, and in which each of the arm parts 22 is respectively installed with an ear seat 21 and a pivotal connection hole 211 set on the ear seat 21 at the interior corner thereof, as well as a hollow accommodation part 24 constituted by the arm parts 22 and the traverse board part 23 to receive the junction box 1 inside the hollow accommodation part 24 upon rotation folding the base 2. The pivotal connection button 11 of the junction box 1 is pivotally and movably connected to the pivotal connection hole 211 in the base 2, the pivotal connection button 11 may be a pivotal connection protrusive point of a hemispherical shape, and the pivotal connection hole 211 can be also a recess comprised of a hemispherical shape, such that, when the pivotal connection hole is movably sleeve jointed with the pivotal connection protrusive point, a movable and detachable base can be formed. Moreover, the traverse board part 23 of the base 2 can be installed with a trough 231, in which the trough 231 is mutually clip jointed to a second positioning protrusive board 32 of a micro inverter 3 (see FIG. 4A). The aforementioned structure can further enhance the stability of the clip joint between the detachable junction box base and the micro inverter 3 thereby preventing wearing and loosening problems in the product due to frequent applications. The trough 231 can act as the operation space for rotating the base 2 in order to open flat the base 2 or fold it up for accommodation.

Figure 2A:
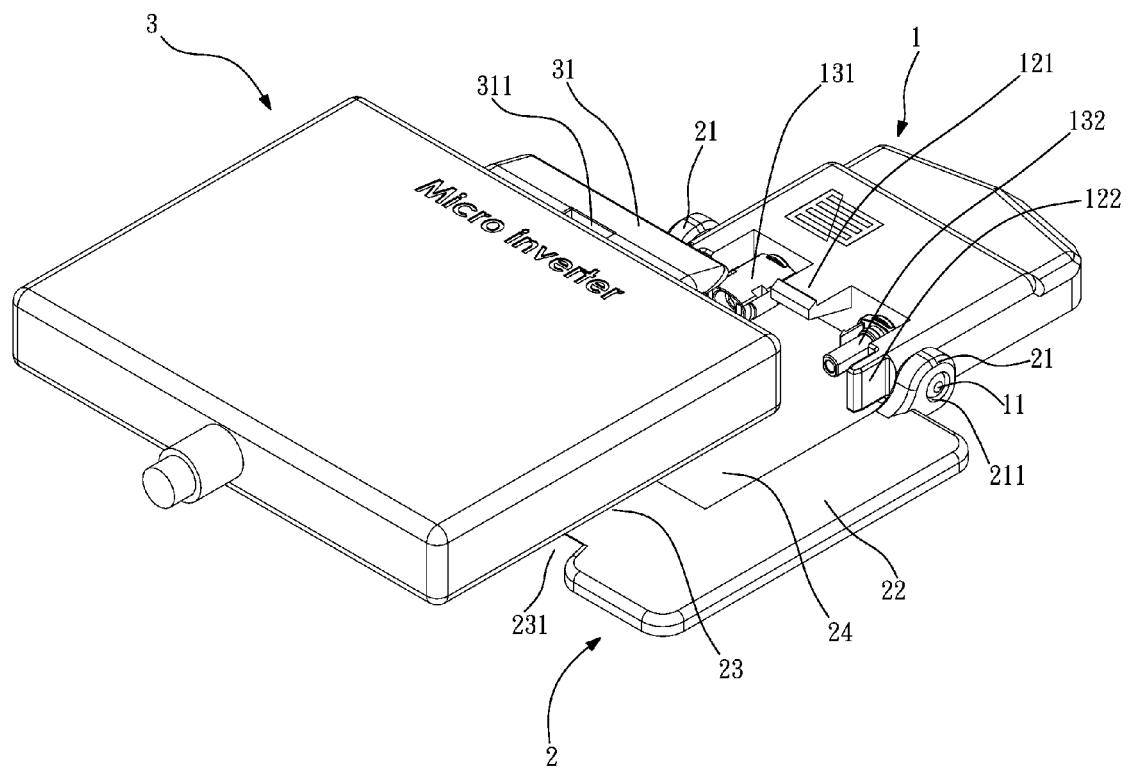
FIG. 2A illustrates a stereo perspective view of the detachable junction box base according to an embodiment of the present invention, before connected to a micro inverter.
Figure 2B:
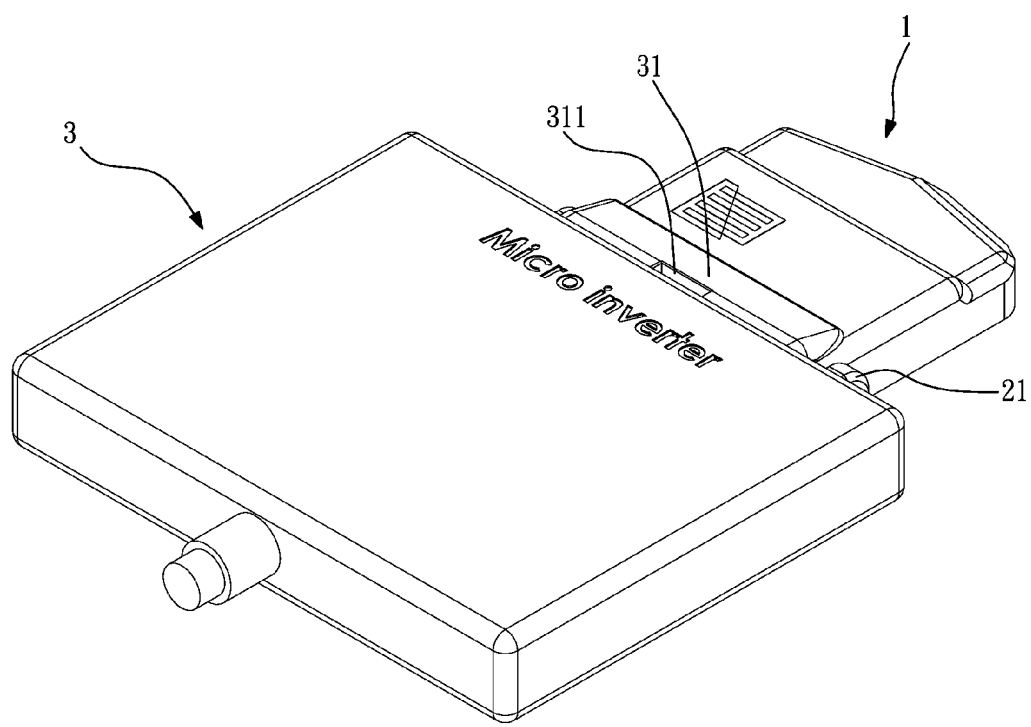
FIG. 2B illustrates a stereo perspective view of the detachable junction box base according to an embodiment of the present invention, after connected to a micro inverter.
Figure 3A:
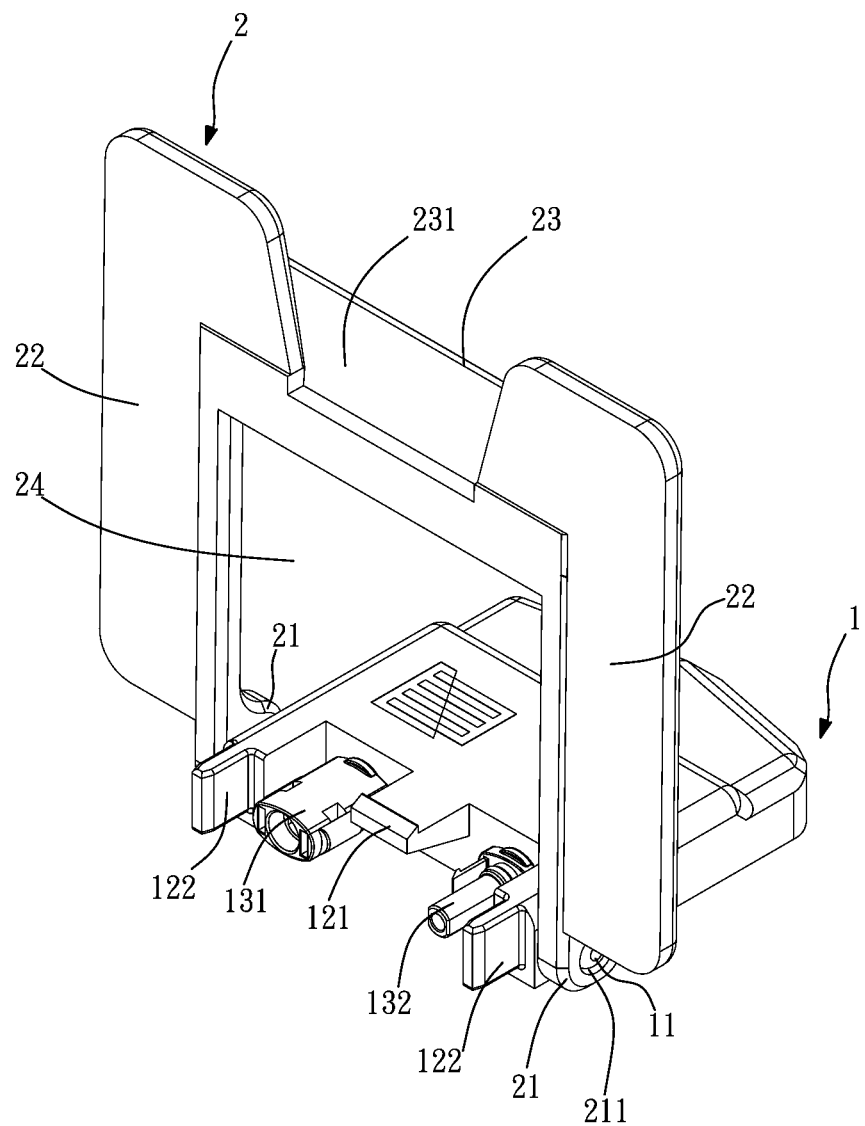
FIG. 3A illustrates a stereo perspective view of the detachable junction box base according to an embodiment of the present invention, after a 90° rotation.
Figure 3B:
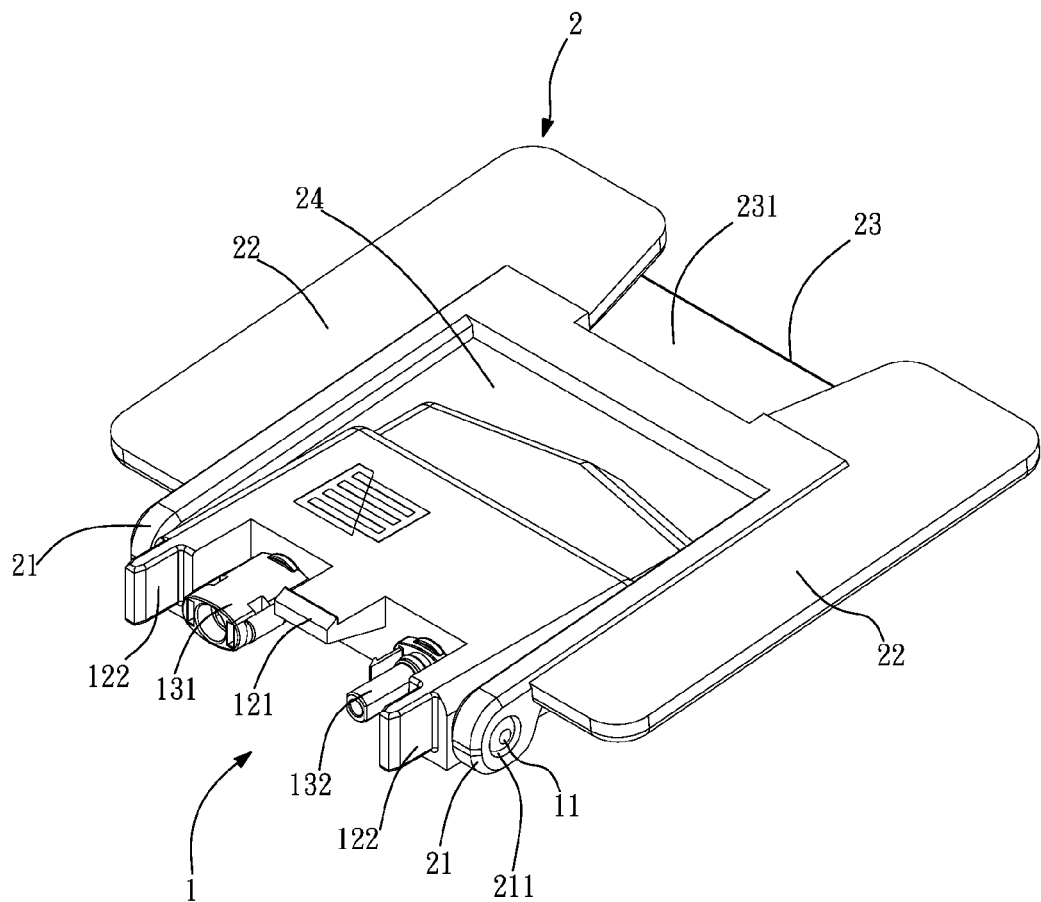
FIG. 3B illustrates a stereo perspective view of the detachable junction box base according to an embodiment of the present invention, after a 180° rotation.

Next, FIGS. 2A and 2B illustrates stereo perspective views of the detachable junction box base before and after connected to a micro inverter according to an embodiment of the present invention. As shown in Figures, the two connection ports 131, 132 of the junction box 1 respectively can be mutually connected to a connection port 33 installed on a DC/AC micro inverter, a DC/DC converter or a DC/DC optimizer, which can be connected to devices of various specifications thereby increasing the applicability of the detachable junction box base according to an embodiment of the present invention. Furthermore, the elastic snap tab 121 and the two elastic clip tabs 122 of the junction box 1 respectively can be mutually clipped to a snap hole 311 and two clip holes (not shown) of a first positioning protrusive board 31 installed on a DC/AC micro inverter, a DC/DC converter or a DC/DC optimizer such that the structural design thereof may prevent wearing and loosening problems in the product due to frequent applications. Herein a bar-shaped hook is installed on the edge of the bottom side in the elastic snap tab 121 to enable a firm snap joint to the snap hole 311.

FIGS. 3A, 3B, 4A, 4B, 5A, 5B, 6A and 6B illustrate stereo perspective views of the detachable junction box base in 90-degree and 180-degree rotation configurations; right side views thereof, before and after connected to a micro inverter; right side views thereof, with the junction box and the base being separated; right side views thereof; and right side views thereof, 90-degree and 180-degree rotation configurations, according to an embodiment of the present invention are respectively shown. As shown in Figures, the movable base 2 can be pivotally rotated 180-degree both in clockwise and anticlockwise rotations using the pivotal connection button 11 as the rotation axis in a flat opened configuration along with the junction box 1 in application, otherwise folded up for accommodations. Besides, when the base 2 is folded up with the junction box 1, the junction box 1 can be received inside a hollow accommodation part 24 of the base 2, indicating that the form and position of the hollow accommodation part 24 is suitably shaped in accordance with the profile and location of the junction box 1 such that the base 2 can use the pivotal connection button 11 as a rotation axis to be flatly opened in use or folded for accommodations, so, in package, the space occupation of the present product can be reduced by folding such two components. In addition, the traverse board part 23 of the base 2 can be installed with a trough 231, in which the trough 231 is mutually clip jointed to a second positioning protrusive board 32 of the micro inverter 3 and allows the operation space for rotationally flipping the base 2 thereby increasing convenience in product application or accommodation. Furthermore, the pivotal connection holes 211 configured on the base 2 allow to be detached or jointed to the pivotal connection buttons 11 on the junction box 1, thus simplifying installation procedures and possibly eliminating the requirements of screws and hole piercing processes; as such, to complete a detachment operation, a user needs only to gently hold the ear seat 21 and apply outwardly a pull force on the ear seat 21 to separate the pivotal connection hole 211 of the ear seat 21 from the pivotal connection button 11. The assembly steps thereof are analogous. That is, a user can gently hold the ear seat 21 and move the pivotal connection hole 211 close to the pivotal connection button 11, apply outwardly a pull force on the ear seat 21 and then release the pull force, such that the pivotal connection hole 211 of the ear seat 21 is successfully clip jointed to the pivotal connection button 11 to complete the assembly operations and the base 2 can be a movable and detachable base.

In summary, based on the contents set forth as above, the present invention indeed achieves the expected objectives through the firm and stable connections between the detachable junction box base and the micro inverter, detachable modularization design and receivable structure thereof, thus enabling the aspects of excellent feasibility, increased connection stability in the junction box, convenient detachment operations, handy package as well as connectivity to devices of various specifications, which clearly demonstrates the significant application value thereof. Therefore, the characteristics in terms of innovation, inventive step and industrial usability required for patent applications are fulfilled, thus herein submitting the present application in accordance with relevant patent laws and regulations for legal protections.

However, the descriptions set forth as above illustrate simply certain preferred embodiments of the present invention, and all effectively equivalent modifications in design made within the scope of the present invention are intended to be encompassed by the technical range of the present invention.

What is claimed is:

1. A detachable junction box base, comprising:
   a junction box, comprising left and right sides being respectively installed with a pivotal connection button, and a bottom side thereof being installed with at least an elastic snap tab, two elastic clip tabs, a first connection port and a second connection port; and
   a base, comprising a body thereof being an integral base formed by two arm parts and a traverse board part, in which the two arm parts are located at left and right sides of the base and the traverse board part is disposed at a front end of the base, and in which each of the arm parts is respectively installed with an ear seat and a pivotal connection hole at an interior corner thereof, as well as a hollow accommodation part constituted by the arm parts and the traverse board part to receive the junction box.

2. The detachable junction box base according to claim 1, wherein the pivotal connection button of the junction box is pivotally and movably connected to the pivotal connection hole in the base.

3. The detachable junction box base according to claim 2, wherein the pivotal connection button can be a pivotal connection protrusive point comprised of a hemispherical shape.

4. The detachable junction box base according to claim 2, wherein the pivotal connection hole can be a recess comprised of a hemispherical shape allowing a movable sleeve joint with the pivotal connection protrusive point.

5. The detachable junction box base according to claim 1, wherein the two connection ports of the junction box respectively can be mutually connected to a connection port installed on a DC/AC micro inverter, a DC/DC converter or a DC/DC optimizer.

6. The detachable junction box base according to claim 1, wherein the elastic snap tab and the two elastic clip tabs of the junction box respectively can be mutually clipped to a snap hole and two clip holes of a first positioning protrusive board installed on a DC/AC micro inverter, a DC/DC converter or a DC/DC optimizer.

7. The detachable junction box base according to claim 1, wherein the base is a detachable base allowing detachment of such pivotal connection buttons through the pivotal connection holes.

8. The detachable junction box base according to claim 1, wherein the base is a movable base allowing 180° rotations using the pivotal connection button as the rotation axis center in an open-flat or folded profile along with the junction box.

9. The detachable junction box base according to claim 8, wherein, upon the base being folded with the junction box, the junction box is received inside the hollow accommodation part of the base.

10. The detachable junction box base according to claim 1, wherein the traverse board part of the base is installed with a trough, in which the trough is mutually clip jointed to a second positioning protrusive board of the micro inverter and allows operation space for rotating the base.

* * * * *